(12) United States Patent  
Hamada

(10) Patent No.: US 8,860,839 B2  
(45) Date of Patent: Oct. 14, 2014

(54) LIGHT-EMITTING APPARATUS AND CAMERA SYSTEM INCLUDING THE SAME

(75) Inventor: Masataka Hamada, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/282,972

(22) Filed: Oct. 27, 2011

(65) Prior Publication Data

US 2013/0010155 A1    Jan. 10, 2013

(30) Foreign Application Priority Data

Jul. 8, 2011  (KR) .................. 10-2011-0067973

(51) Int. Cl.
- *H04N 9/73* (2006.01)
- *H04N 5/235* (2006.01)
- *H04N 5/225* (2006.01)
- *G03B 15/02* (2006.01)

(52) U.S. Cl.
CPC ............. *H04N 5/2256* (2013.01); *G03B 15/02* (2013.01); *H04N 5/2354* (2013.01); *G03B 2215/0567* (2013.01); *H04N 5/2351* (2013.01)
USPC ................. 348/223.1; 348/222.1; 348/371

(58) Field of Classification Search
CPC ... H04N 5/235; H04N 5/2351; H04N 5/2354; H04N 5/2256
USPC ........... 348/223.1, 222.1, 370, 371, 366, 362, 348/277
See application file for complete search history.

(56) References Cited

U.S. PATENT DOCUMENTS

| | | | | |
|---|---|---|---|---|
| 5,617,139 A | * | 4/1997 | Okino | 348/223.1 |
| 6,081,076 A | * | 6/2000 | Ogawa | 315/241 P |
| 7,106,378 B2 | * | 9/2006 | Kawakami | 348/371 |
| 7,342,610 B2 | * | 3/2008 | Okubo | 348/371 |
| 7,542,182 B2 | * | 6/2009 | Yamamoto et al. | 358/474 |
| 2006/0067668 A1 | * | 3/2006 | Kita | 396/182 |
| 2006/0077284 A1 | * | 4/2006 | Kurosawa | 348/371 |
| 2006/0257130 A1 | | 11/2006 | Lee et al. | |
| 2007/0195176 A1 | * | 8/2007 | Kawakami | 348/222.1 |
| 2007/0257992 A1 | * | 11/2007 | Kato | 348/223.1 |

FOREIGN PATENT DOCUMENTS

| | | |
|---|---|---|
| EP | 1176849 A2 | 1/2002 |
| JP | 2009-042773 A | 2/2009 |
| WO | 02/47438 A2 | 6/2002 |
| WO | 2006/129777 A1 | 12/2006 |

OTHER PUBLICATIONS

Extended European Search Report issued in related application EP12157298.6, dated Oct. 4, 2012, 7 pages.

* cited by examiner

*Primary Examiner* — Sinh Tran  
*Assistant Examiner* — Zhenzhen Wu  
(74) *Attorney, Agent, or Firm* — Drinker Biddle & Reath LLP

(57) ABSTRACT

A light-emitting apparatus and a camera system including the same are disclosed. According to an aspect of the invention, a camera system is provided that includes a light source color detector for detecting a color temperature of a light source; an auxiliary light apparatus for changing a color temperature of auxiliary light according to the detected color temperature of the light source; and a white balance controller for adjusting white balance while the auxiliary light is being radiated. Accordingly, a photograph having a natural color sense can be reproduced by reducing a sense of color incongruity in a captured image.

19 Claims, 12 Drawing Sheets

LIGHT-EMITTING APPARATUS AND CAMERA SYSTEM INCLUDING THE SAME

CROSS-REFERENCE TO RELATED PATENT APPLICATION

This application claims the priority benefit of Korean Patent Application No. 10-2011-0067973, filed on Jul. 8, 2011, in the Korean Intellectual Property Office, the disclosure of which is incorporated herein in its entirety by reference.

BACKGROUND

1. Field of the Invention

The invention relates to a light-emitting apparatus and a camera system including the same.

2. Description of the Related Art

When an object is photographed with a digital camera, a color sense of a captured image may be different from that of the object, as recognized by the naked eyes of a person. One of reasons causing the difference is a mismatch in white balance.

In digital cameras, a white balance function is a function for obtaining an accurate color of an object in an image. When photographing is performed outdoors in sunlight, the color sense difference is not that significant. However, a color sense of an image captured with white lighting or under other lightings conditions may be significantly different from that desired by a user. Thus, to capture an image desired by the user, correct white balance adjustment must be performed.

When photographing is performed with a camera flash, white balance adjustment is performed under light-emission of the camera flash. However, according to the prior art, a color difference occurs between a portion on which the camera flash is radiated and a background on which the camera flash is not radiated, and even though the white balance adjustment is performed, an unnatural image in which color reproduction characteristics are bad is captured.

FIGS. 15 and 16 illustrate images captured by a conventional digital camera.

Referring to FIG. 15, in a dark environment, a case where a fluorescent lamp or a mercury lamp is lighted in a background is not uncommon. When photographing is performed with a camera flash in this environment, settings for the white balance adjustment are determined based on white light radiated by the camera flash on the object. However, while the object on which the camera flash radiates is adjusted to a correct color, a color of a background is represented according to lighting of the background because light from the camera flash does not influence lighting of the background. That is, in FIG. 15, while proper white balance adjustment is performed for a person in the foreground, a green color is represented for a person in the background due to a fluorescent lamp or a mercury lamp.

Referring to FIG. 16, when photographing is performed under an evening glow or a morning glow, red backlighting often occurs. When photographing is performed with a camera flash in this environment, the main object is reproduced with a proper color, and a red color on the background is represented more than actually sensed. Or, even when photographing is performed without a camera flash, a color of the background is represented red.

That is, according to the prior art, even though correct white balance adjustment is performed, a user may sense incongruity in a captured image.

SUMMARY

The invention provides a light-emitting apparatus for reproducing a photograph having a natural color sense by removing a sense of incongruity in a captured image and a camera system including the same.

According to an aspect of the invention, there is provided a camera system including: a light source color detector for detecting a color temperature of a light source; an auxiliary light apparatus for changing a color temperature of auxiliary light according to the detected color temperature of the light source, and radiating the auxiliary light onto an object; and a white balance controller for adjusting white balance while the auxiliary light is being radiated.

The auxiliary light apparatus may be a light-emitting device capable of shifting a wavelength.

The light-emitting device may be an Organic Light-emitting Diode (OLED), an EL, or an LED.

The auxiliary light apparatus may be a light-emitting device for emitting colored light selected according to at least one of a first group {red R, green G, blue B}, a second group {cyan C, magenta M, yellow Y}, or a third group {red R, green G, blue B, white W}.

The auxiliary light apparatus may control the color temperature of the auxiliary light by adjusting a power ratio of each of a plurality of color elements.

The adjustment of the power ratio may be performed by adjusting any at least one of a current value, a resistance value, or a light-emitting pulse duty ratio of a light-emitting device.

Each color of light emitted by the light-emitting device may be the same as a color of a color filter of an image pickup device included in the camera system.

The auxiliary light apparatus and the white balance controller may be embedded in a digital camera for capturing an image of an object.

The light source color detector may be a light source color detecting sensor embedded in the digital camera.

The light source color detector may detect the color temperature of the light source from color information during pre-light-emitting and color information during non-light-emitting of a light-emitting apparatus.

The detection of the color temperature of the light source may be performed by sequentially pre-emitting light of the color elements included in the auxiliary light apparatus, receiving light reflected according to the pre-light-emitting in the image pickup device, and dividing the reflected light into a light source color component and an object color component using the color information during non-light-emitting and color information of the reflected light.

The light source color detector and the white balance controller may be embedded in a digital camera for capturing an image of an object, and the auxiliary light apparatus may be detachably attached to the digital camera.

According to another aspect of the invention, there is provided a light-emitting apparatus including: a light source color detector for detecting a color temperature of a light source; and an auxiliary light apparatus for changing a color temperature of auxiliary light according to the detected color temperature of the light source, and radiating the auxiliary light onto an object.

The light-emitting apparatus may be plugged to a digital camera.

The light-emitting apparatus may transmit information regarding the detected color temperature of the light source and emitted light color information of the auxiliary light apparatus to the digital camera.

The auxiliary light apparatus may be a light-emitting device capable of shifting a wavelength.

The auxiliary light apparatus may be a light-emitting device for emitting colored light selected according to at least one of a first group {red R, green G, blue B}, a second group {cyan C, magenta M, yellow Y}, or a third group {red R, green G, blue B, white W}.

The auxiliary light apparatus may control the color temperature of the auxiliary light by adjusting a power ratio of each of a plurality of color elements.

According to another aspect of the invention, there is provided a light-emitting method including detecting a color temperature of a light source, selecting a color temperature of auxiliary light according to the detected color temperature of the light source, and radiating the auxiliary light onto an object.

The method may also include adjusting a white balance while the auxiliary light is being radiated onto the object.

As described above, the light-emitting apparatus and the camera system including the same according to embodiments of the invention may reproduce a photograph having a generally natural color even if an object on which light of the light-emitting apparatus is radiated and an object on which the light of the light-emitting apparatus is not radiated exist together.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
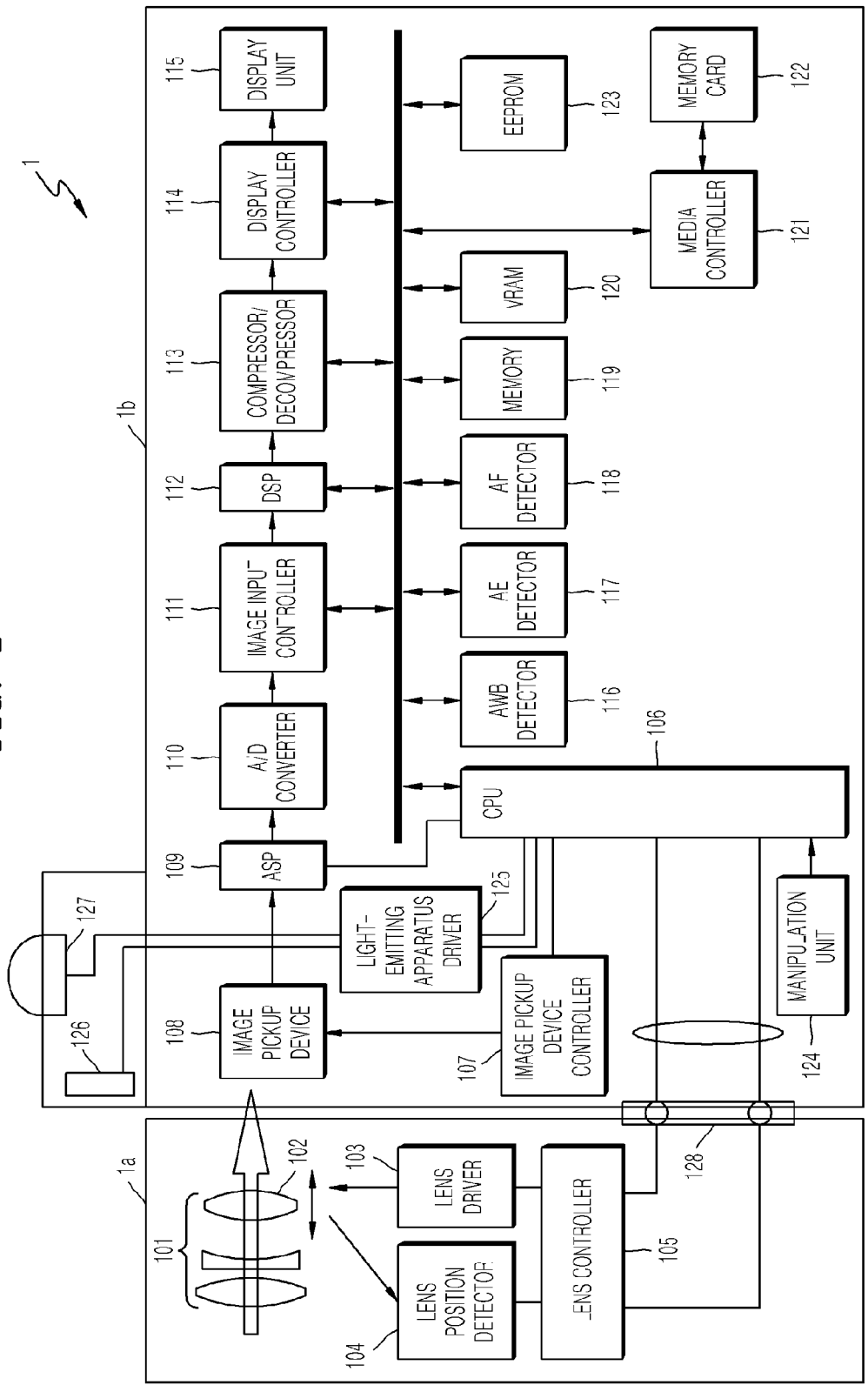
FIG. 1 is a block diagram of a digital camera, according to an embodiment of the invention.

The invention may allow various kinds of change, modification and various changes in form, and exemplary embodiments will be illustrated in drawings and described in detail in the specification. However, it should be understood that the exemplary embodiments do not limit the invention to a specific disclosed form but include every modification, equivalent, or replacement within the spirit and technical scope of the disclosure. In the following description, well-known functions or constructions are not described in detail because they would obscure the invention with unnecessary detail.

The invention will now be described more fully with reference to the accompanying drawings, in which exemplary embodiments of the invention are shown. Like reference numerals in the drawings denote like elements, and thus their repetitive description will be omitted.

Configuration of a Digital Camera

FIG. 1 is a block diagram of a digital camera 1, according to an embodiment of the invention. The digital camera 1 of FIG. 1 can be divided into a main body 1b and a lens unit 1a.

Referring to FIG. 1, the digital camera 1 includes the lens unit 1a and the main body 1b, wherein the lens unit 1a is detachably attached to the main body 1b through a lens mount 128.

The lens unit 1a includes an image pickup lens 101, a lens driver 103, a lens position detector 104, and a lens controller 105.

The image pickup lens 101 includes a focus lens 102, by which focusing can be performed by driving the focus lens 102.

The lens driver 103 drives the focus lens 102 under a control of the lens controller 105, and the lens position detector 104 detects a position of the focus lens 102 and transmits the detected position to the lens controller 105.

The lens controller 105 controls an operation of the lens driver 103 and receives position information from the lens position detector 104. The lens controller 105 also transmits and receives information associated with focus detection to and from a Central Processing Unit (CPU) 106 of the main body 1b by communicating with the CPU 106.

The main body 1b includes the CPU 106, an image pickup device controller 107, an image pickup device 108, an Analog Signal Processor (ASP) 109, an Analog/Digital (A/D) converter 110, an image input controller 111, a Digital Signal Processor (DSP) 112, a compressor/decompressor 113, a display controller 114, a display unit 115, an Automatic White Balance (AWB) detector 116, an Automatic Exposure (AE) detector 117, an Automatic Focus (AF) detector 118, a memory 119, a Variable Random Access Memory (VRAM) 120, a media controller 121, a memory card 122, an Electrically Erasable Programmable Read Only Memory (EEPROM) 123, a manipulation unit 124, a light-emitting apparatus driver 125, an auxiliary light apparatus 126, and a light source color detector 127.

The CPU 106 controls an overall operation of the digital camera 1.

The image pickup device controller 107 generates a timing signal and applies the generated timing signal to the image pickup device 108, thereby controlling an image pickup operation of the image pickup device 108. In addition, the image pickup device controller 107 controls the image pickup device 108 to sequentially read an image signal when electric charges are completely accumulated on each scan line of the image pickup device 108.

The image pickup device 108 generates an image signal by picking up object image light that has passed through the image pickup lens 101. The image pickup device 108 may include photoelectric conversion elements arranged in a matrix form and a charge transmission path for delivering charges from the photoelectric conversion elements.

The ASP 109 removes noise from the image signal captured by the image pickup device 108 or amplifies the magnitude of the image signal to a predetermined level. The A/D converter 110 converts an analog image signal output from the ASP 109 into a digital image signal. The image input controller 111 processes the image signal output from the A/D converter 110 so as to be processed by every component thereafter.

AWB processing, AE processing, and AF processing of the image signal output from the image input controller 111 are performed by the AWB detector 116, the AE detector 117, and the AF detector 118, respectively.

The image signal output from the image input controller 111 may also be temporarily stored in the memory 119, such as a Synchronous Dynamic Random Access Memory (SDRAM).

The DSP 112 generates a live view image or a captured image displayable on the display unit 115 by performing a series of image signal processing operations, such as gamma correction, on the image signal output from the image input controller 111. The DSP 112 may also perform white balance adjustment on a captured image according to a white balance gain detected by the AWB detector 116. That is, the DSP 112 and the AWB detector 116 may be an example of a white balance controller.

The compressor/decompressor 113 compresses or decompresses an image signal on which image signal processing has been performed. In a case of compression, an image signal is compressed in accordance with a compression format, e.g., a JPEG compression format or an H.264 compression format. An image file including image data generated by the compression processing is transmitted to the media controller 121, and the media controller 121 stores the image file in the memory card 122.

The display controller 114 controls an image output to the display unit 115. The display unit 115 displays images, such as a captured image and a live view image, and various kinds of setting information. The display unit 115 and the display controller 114 may be implemented using a Liquid Crystal Display (LCD) and an LCD driver, respectively. However, the invention is not limited thereto, and an Organic Electric Luminescence (EL) display (OLED) and an OLED driver, for example, may be used.

The VRAM 120 temporarily stores information, such as images to be displayed on the display unit 115, and the EEPROM 123 may store programs that may be executed for controlling the digital camera and various kinds of management information.

The manipulation unit 124 is a unit for inputting various kinds of commands by a user to operate the digital camera 1. The manipulation unit 124 may include various buttons, such as a shutter release button, a main switch, a mode dial, and a menu button.

The light-emitting apparatus driver 125 is a circuit for driving auxiliary light for photography or AF auxiliary light. The light-emitting apparatus driver 125 radiates light onto an object from a light-emitting device included in the auxiliary light apparatus 126 during photographing or AF driving by driving the auxiliary light apparatus 126.

The auxiliary light apparatus 126 is an apparatus for emitting auxiliary light during AF driving or photographing. The auxiliary light apparatus 126 may adjust a color temperature of emitted auxiliary light. The light-emitting device included in the auxiliary light apparatus 126 may be a solid light-emitting device, such as an LED, an OLED, or an EL.

The light source color detector 127 is a sensor for detecting a color temperature of a light source. The light source color detector 127 may detect light reflected from an object and the color temperature of the light source in a capturing environment. To do this, the light source color detector 127 may be disposed on the digital camera 1 or in a light source direction.

Figure 2A:
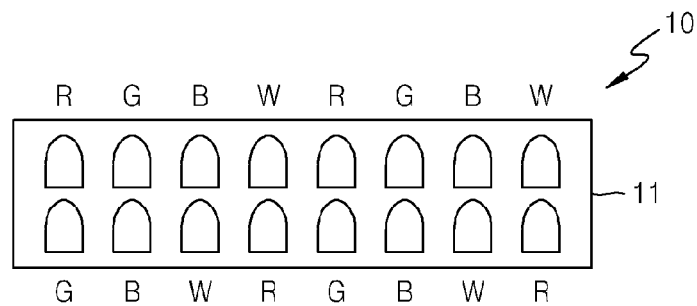
FIG. 2A is a front view of an auxiliary light apparatus, according to an embodiment of the invention.
Figure 2B:
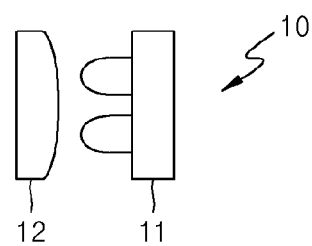
FIG. 2B is a side view of the auxiliary light apparatus of FIG. 2A.

FIG. 2A is a front view of an auxiliary light apparatus 10 according to an embodiment of the invention, and FIG. 2B is a side view of the auxiliary light apparatus 10 of FIG. 2A.

Referring to FIGS. 2A and 2B, the auxiliary light apparatus 10 is an apparatus for emitting light in a case where an object is inadequately illuminated. Although a xenon lamp has been used conventionally, a solid light-emitting device is used as the auxiliary light apparatus 10 in the embodiments of the invention. Thus, the auxiliary light apparatus 10 can change a color of radiated light, and the digital camera 1 can be minimized in size.

The auxiliary light apparatus 10 may include a light-emitting device unit 11 and a projection lens 12. The light-emitting device unit 11 may include a plurality of differently colored solid light-emitting devices, such as an LED, an OLED, or an EL. The projection lens 12 may be disposed on the light-emitting device unit 11 and may be a dome typed lens.

In the current embodiment, 4-colored LEDs (red R, green G, blue B, and white W) are installed in upper and lower sides of the light-emitting device unit 11. A color of emitted light can be adjusted by adjusting a light-emitting power of each color.

The colors of the light-emitting device unit 11 are only illustrative ones and are not limited thereto. For example, a combination of three color elements, i.e., red R, green G, and blue B, or six color elements, i.e., red R, green G, blue B, cyan C, magenta M, and yellow Y, may represent the colors of the light-emitting device unit 11. Although 16 light-emitting devices are included in the light-emitting device unit 11 in the current embodiment, 3 or more light-emitting devices is acceptable.

The auxiliary light apparatus 10 may radiate auxiliary light of various color temperatures onto an object. In this case, the three colors red R, green G, and blue B used as colors of light-emitting devices are defined to be the same as colors used in a color filter of the image pickup device 108, if possible, thereby increasing control efficiency for performing a white balance function.

Figure 3:
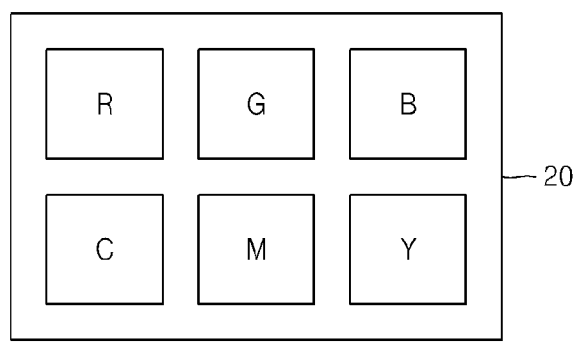
FIG. 3 is a diagram of a light source color detector, according to an embodiment of the invention.

FIG. 3 is a diagram of a light source color detector 20, according to an embodiment of the invention.

Referring to FIG. 3, a light source color detecting sensor is shown as the light source color detector 20. The light source color detecting sensor may include a silicon photo-diode (SPD) to which filters of red R, green G, blue B, cyan C, magenta M, and yellow Y are attached. The light source color detector 20 may also include a dome-type semi-transparent diffusion plate (not shown) on the SPD.

The light source color detector 20 may detect a color temperature by simply detecting a light source color of a surrounding environment or a spectrum distribution of a background using the above-described light source detection configuration. In this case, the light source color detector 20 is disposed so that influence of background light affecting a reflected light color is reduced.

The light source color detecting sensor detects a light source color of a background. When auxiliary light for photographing is used, the auxiliary light apparatus 126 emits light by setting a color temperature of a light source of the auxiliary light to be substantially the same as that of the background. The DSP 112 sets a white balance when the auxiliary light is radiated during photographing, i.e., in a state of mixing a light source of the background and a light source of the auxiliary light, thereby reproducing a color of an object without any influence of the light source color of the background. Obviously, because the light source color detector 127 also has information regarding the light source color of the background, the white balance may be set to represent an atmosphere of the light source color of the background.

Figure 4:
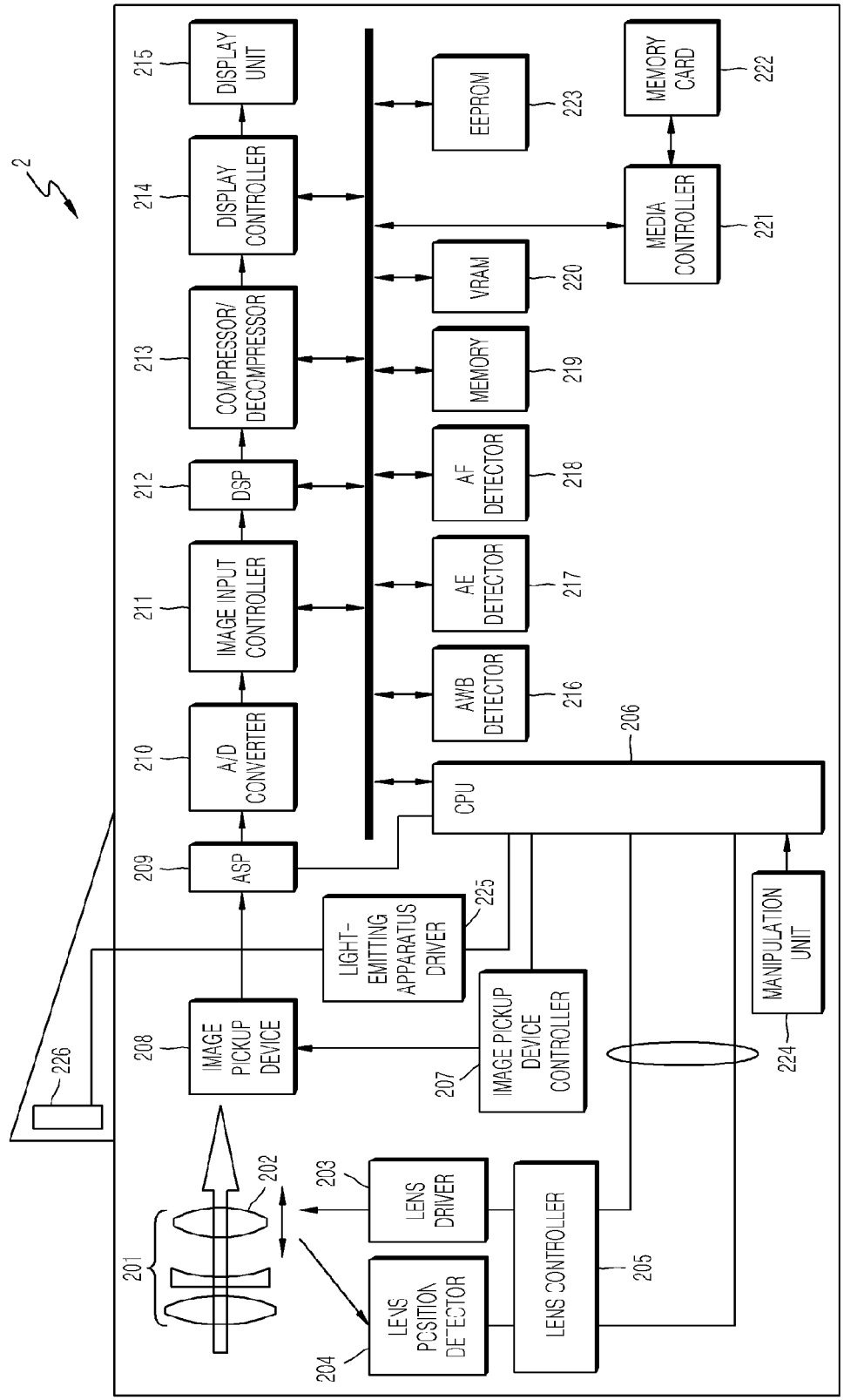
FIG. 4 is a block diagram of a digital camera, according to another embodiment of the invention.

FIG. 4 is a block diagram of a digital camera 2, according to another embodiment of the invention. In the current embodiment, a method of detecting a color temperature of a light source using an image pickup device 208 and an auxiliary light apparatus 226 is used. That is, unlike the digital camera 1, the separate light source color detector 127 is not included.

Referring to FIG. 4, light received by the digital camera 2 may be represented by IO=LO×D, assuming that light received by the image pickup device 208 is IO, background light is LO, and light reflected from an object is D. When white auxiliary light is radiated onto the object, light received by the image pickup device 208 may be represented by I=L×D(w), assuming that the light received by the image pickup device 208 is I, the white auxiliary light is L, and white light reflected from the object is D(w).

A light reflection ratio of an object varies according to a color. Thus, to obtain a reflection ratio of each color, reflection ratios D(r), D(g), and D(b) of red R, green G, and blue B colors are obtained by emitting each of the colors.

When light of red R, green G, and blue B colors received by the image pickup device 208 is Ir, Ig, and Ib, respectively, and when auxiliary light of red R, green G, and blue B colors is R, G, and B, respectively, the following equations can be obtained.

$$Ir=R\times D(r), Ig=G\times D(g), Ib=B\times D(b)$$

Or $$D(r)=Ir/R, D(g)=Ig/G, D(b)=Ib/B$$

Because a reflection ratio of an object is represented by D=D(r)×D(g)×D(b), the reflection ratio of an object may be obtained by sequentially emitting light of each of red R, green G, and blue B colors. Thus, because information regarding light received by the image pickup device 208, i.e., IO, can be obtained by background light, i.e., LO, the background light, i.e., LO, can be obtained by the following equation.

$$LO=IO/D=IO/(D(r)\times D(g)\times D(b))$$

That is, color information regarding the background light can be obtained.

There is a case where a reflection ratio of an object cannot be correctly obtained because of a distance from the object. Thus, in this case, a reflection ratio by white light may be used as a reference. For example, the following equations can be obtained by a ratio of a reflection ratio D(r) by R to a reflection ratio D(w) by white light.

$$D(r)/D(w)=(Ir/R)/(I/L)$$

$$D(r)=((Ir\times L)/(I\times R))\times D(w)$$

Likewise, the following equations can be obtained for D(g) and D(b).

$$D(g)=((Ig\times L)/(I\times G))\times D(w)$$

$$D(b)=((Ib\times L)/(I\times B))\times D(w)$$

In addition, D(r), D(g), and D(b) values obtained from the above equations may be substituted to LO=IO/(D(r)×D(g)× D(b)).

Thus, in the current embodiment, a reflection ratio of each color from an object is obtained by sequentially radiating light of red R, green G, and blue B colors or red R, green G, blue B, and white W colors onto the object. Thereafter, a color temperature of background light is obtained, and an auxiliary light apparatus 226 is controlled so that auxiliary light of a color temperature that is substantially the same as that of the background light is emitted. Photographing is performed while the auxiliary light is radiated onto the object, and a white balance is adjusted based on the background light and the auxiliary light radiated onto the object. That is, in the current embodiment, the white balance is adjusted using pre-emitted light.

In the current embodiment, the digital camera 2, including a lens unit and a main body in a one body, is used, and the current embodiment is substantially the same as the embodiment of FIG. 1 except that a light source color detecting sensor as a light source color detector is omitted.

Figure 5:
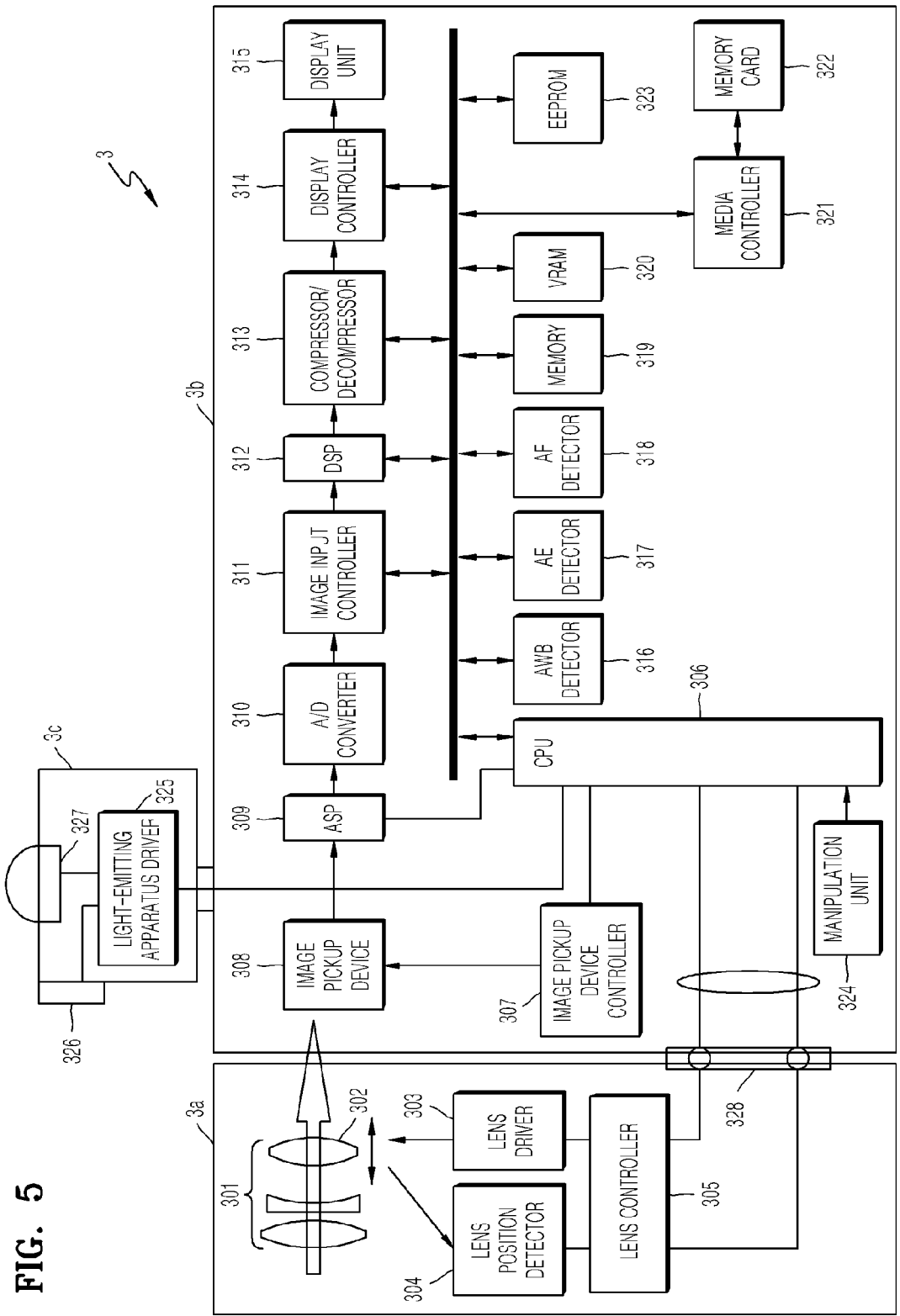
FIG. 5 is a block diagram of a digital camera, according to another embodiment of the invention.

FIG. 5 is a block diagram of a digital camera 3, according to another embodiment of the invention. In the current embodiment, a light-emitting apparatus 3c is detachably attached to a main body 3b.

Referring to FIG. 5, the light-emitting apparatus 3c includes a light-emitting apparatus driver 325, an auxiliary light apparatus 326, and a light source color detector 327. The light-emitting apparatus driver 325 may be connected ton the main body 3b using an assembly, such as an accessory shoe, and can transmit and receive information, i.e., perform communication, through an electrical terminal. The information may be processed by a CPU 306.

According to an operation of the digital camera 3, the light source color detector 327 acquires brightness or color temperature information regarding a light source. The acquired information is transmitted to the CPU 306 through the electrical terminal.

An image pickup device 308 checks the brightness of an object and determines whether to emit auxiliary light during photographing. When a main object is dark or when a color is deflected, the auxiliary light for photographing is used.

Based on the information from the CPU 306, the light-emitting apparatus driver 325 drives the auxiliary light apparatus 326 to pre-emit light, the CPU 306 determines the emitted light intensity of auxiliary light for photography from the intensity of light reflected from an object. Thereafter, the CPU 306 sets the color temperature information acquired from the light source color detector 327 and transmits a command to the light-emitting apparatus driver 325 to emit light of a color substantially corresponding to the acquired color temperature information. According to the command, the auxiliary light apparatus 326 emits auxiliary light during photographing to radiate to the object and adjusts a white balance at once based on background light and the auxiliary light for photographing.

Figure 6:
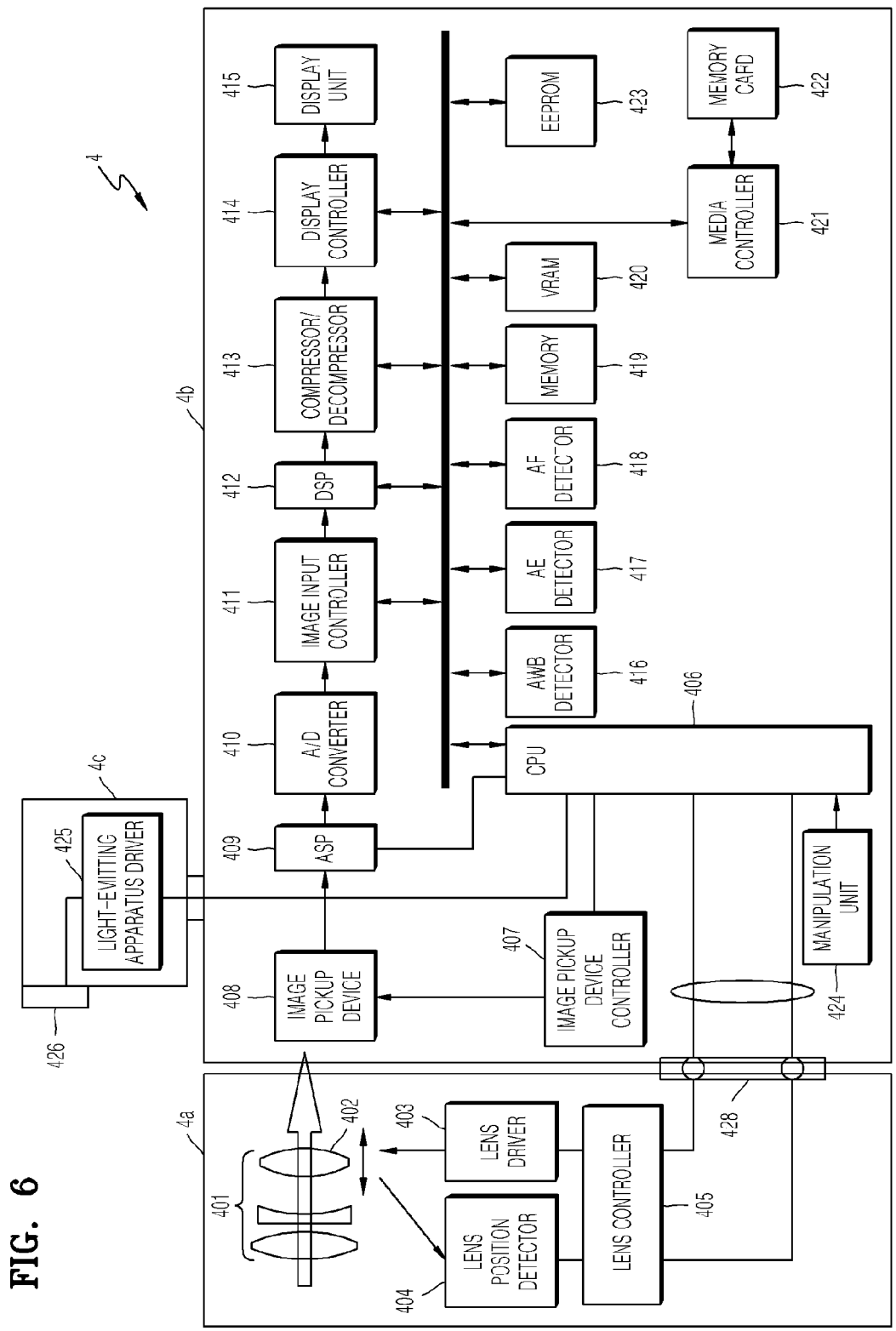
FIG. 6 is a block diagram of a digital camera, according to another embodiment of the invention.

FIG. 6 is a block diagram of a digital camera 4, according to another embodiment of the invention. In the current embodiment, a light-emitting apparatus 4c is detachably attached to a main body 4b.

Referring to FIG. 6, the light-emitting apparatus 4c includes a light-emitting apparatus driver 425 and an auxiliary light apparatus 426. The light-emitting apparatus driver 425 may be connected to the main body 4b using an assembly, such as an accessory shoe, and can transmit and receive information, i.e., perform communication, through an electrical terminal. The information may be processed by a CPU 406.

In the current embodiment, a light source color detector is not included in the light-emitting apparatus 4c, and a white balance is adjusted using an image pickup device 408 and the auxiliary light apparatus 426. A method of detecting a color temperature of a light source is the same as that of the digital camera 2 of FIG. 4.

Because the detection of a color temperature of a light source is performed using the image pickup device 408 and the auxiliary light apparatus 426, the light-emitting apparatus 4c and the CPU 406 need only communicate with each information regarding emission of auxiliary light for photographing.

Figure 7:
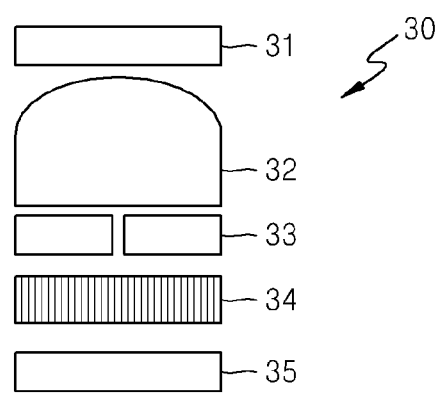
FIG. 7 is a diagram of a light source color detector, according to another embodiment of the invention.

FIG. 7 is a diagram of a light source color detector 30, according to another embodiment of the invention.

Referring to FIG. 7, the light source color detector 30 is a device for detecting a spectrum distribution and includes a diffusion plate 31, a capacitor lens 32, a slit 33, a diffraction grid 34, and a line sensor 35. Light around a camera is incident to the diffusion plate 31 and concentrated at the slit 33 by the capacitor lens 32. The concentrated light is incident on the diffraction grid 34 after passing through the slit 33 and is color-separated by the diffraction grid 34. The separated light is dispersed to corresponding positions on the line sensor 35. Because a spectrum distribution is formed according to the positions on the line sensor 35, spectrum distribution information can be acquired by detecting the intensity of light at each of the positions on the line sensor 35.

Figure 8:
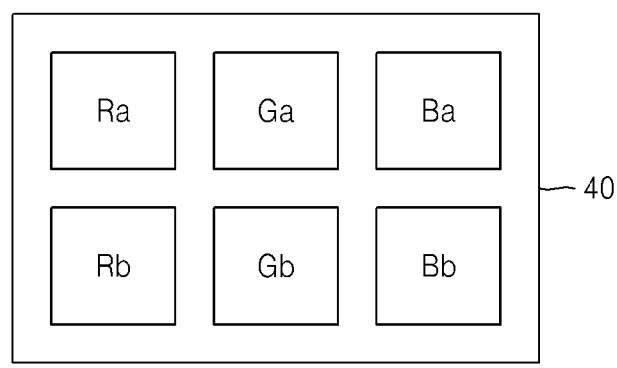
FIG. 8 is a diagram of a light source color detector, according to another embodiment of the invention.

FIG. 8 is a diagram of a light source color detector 40, according to another embodiment of the invention.

Referring to FIG. 8, a light source color detecting sensor is shown as the light source color detector 40 including an SPD to which filters of long-wavelength red (Ra), short-wavelength red (Rb), long-wavelength green (Ga), short-wavelength green (Gb), long-wavelength blue (Ba), and short-wavelength blue (Bb) are attached. The light source color detector 40 may also include a dome-type semi-transparent diffusion plate (not shown) on the SPD.

Because a method of detecting a light source color in the light source color detector 40 is the same as that of the light source color detector 20 of FIG. 3, a description thereof is omitted.

Figure 9A:
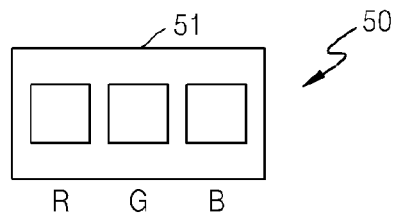
FIG. 9A is a front view of an auxiliary light apparatus, according to another embodiment of the invention.
Figure 9B:
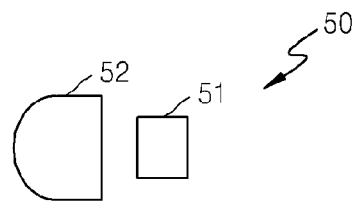
FIG. 9B is a side view of the auxiliary light apparatus of FIG. 9A.

FIG. 9A is a front view of an auxiliary light apparatus 50, according to another embodiment of the invention, and FIG. 9B is a side view of the auxiliary light apparatus 50 of FIG. 9A.

Referring to FIGS. 9A and 9B, the auxiliary light apparatus 50 may include a light-emitting device unit 51 and a projection lens 52. The light-emitting device unit 51 may include 3 light-emitting devices for respectively emitting light of red R, green G, and blue B colors. Solid light-emitting devices, e.g., an LED, an OLED, or an EL, may be used to implement the light-emitting device unit 51. The projection lens 52 is disposed on the light-emitting device unit 51 and may be a dome-type lens.

The light-emitting device unit 51 may control an emitted light intensity ratio of each color by adjusting a current applied to light-emitting devices thereof, thereby adjusting a color of emitted light.

Figure 10A:
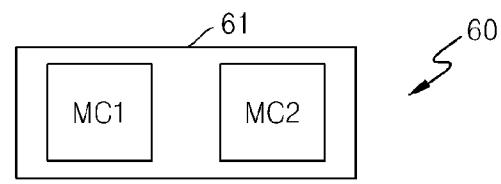
FIG. 10A is a front view of an auxiliary light apparatus, according to another embodiment of the invention.
Figure 10B:
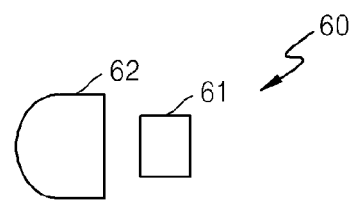
FIG. 10B is a side view of the auxiliary light apparatus of FIG. 10A.

FIG. 10A is a front view of an auxiliary light apparatus 60, according to another embodiment of the invention, and FIG. 10B is a side view of the auxiliary light apparatus 60 of FIG. 10A.

Referring to FIGS. 10A and 10B, the auxiliary light apparatus 60 may include a light-emitting device unit 61 and a projection lens 62. The light-emitting device unit 61 may include 2 light-emitting devices, each of which is a device for modulating a color of emitted light. That is, the light-emitting devices included in the light-emitting device unit 61 can shift a wavelength. In this case, the light-emitting devices included in the light-emitting device unit 61 have different modulatable ranges. For example, a color temperature of emitted light may be controlled by combining MC1 that is mainly modulatable in terms of a long wavelength and MC2 that is mainly modulatable in terms of a short wavelength.

Figure 11:
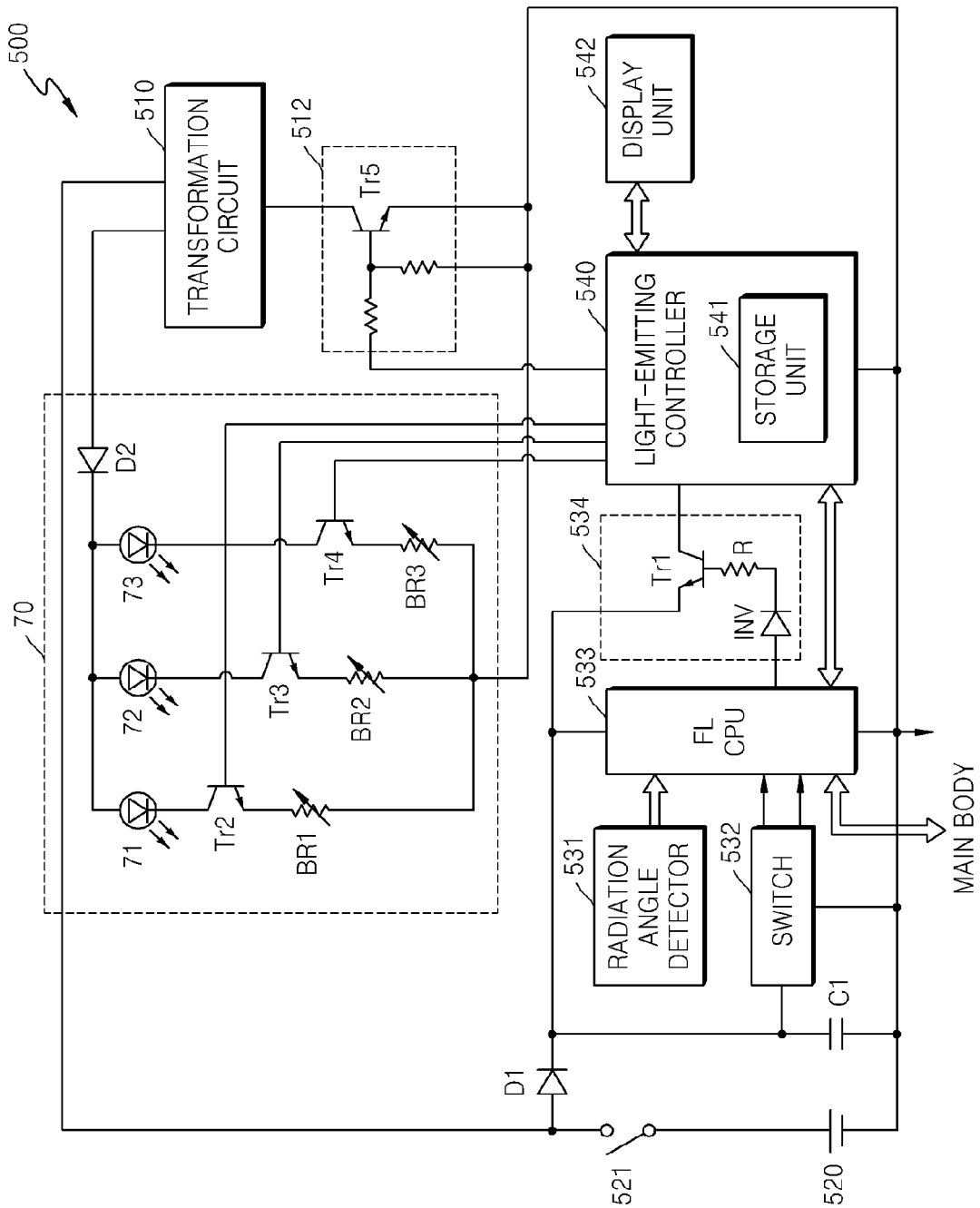
FIG. 11 is a circuit diagram of a light-emitting apparatus driver, according to an embodiment of the invention.

FIG. 11 is a circuit diagram of a light-emitting apparatus driver 500, according to an embodiment of the invention. The light-emitting apparatus driver 500 according to an embodiment of the invention may used to implement the light-emitting device 4c shown in FIG. 6.

Referring to FIG. 11, an auxiliary light apparatus 70 may include a light-emitting device unit, which includes a red R LED 71, a green G LED 72, and a blue B LED 73, and include transistors Tr2, Tr3, and Tr4 for controlling the red R LED 71, the green G LED 72, and the blue B LED 73, respectively. However, this is only an illustration, and colors, types, and the number of light-emitting devices of the light-emitting device unit included in the auxiliary light apparatus 70 may differ. The auxiliary light apparatus 70 may further include variable resistors BR1, BR2, and BR3 for adjusting emitted light intensity of corresponding LEDs, wherein the variable resistors BR1, BR2, and BR3 are real-time controlled by a light-emitting controller 540.

A base of the transistor Tr2 is connected to the light-emitting controller 540, wherein a circuit for distributing a power voltage may be configured in the light-emitting controller 540, and a constant current circuit may be configured by combining the voltage distribution circuit and the variable resistor BR1. A value of the constant current may be adjusted by changing a resistance of the variable resistor BR1 and a resistance included in the voltage distribution circuit. Likewise, for the transistors Tr3 and Tr4, a constant current circuit may be configured by connecting the transistor Tr3 or Tr4 to the light-emitting controller 540.

A Fluorescent Lamp CPU FLCPU 533 controls an overall operation of the auxiliary light apparatus 70. The light-emitting controller 540 controls relative light emission of the red R, green G, and blue B LEDs 71, 72, and 73 of the auxiliary light apparatus 70. The light-emitting controller 540 may include a storage unit 541, wherein the storage unit 541 stores control values of the red R LED 71, the green G LED 72, and the blue B LED 73, which are received by communicating with the main body 4b of the digital camera 4.

Although a method of adjusting the emitted light intensity by adjusting the relative resistances of the variable resistors BR1, BR2, and BR3 has been described in the current embodiment, the invention is not limited thereto. For example, relative emitted light intensity and emitted light colors of the red R LED 71, the green G LED 72, and the blue B LED 73 may be controlled by controlling duty ratios of pulses to control ON/OFF of the transistors Tr2, Tr3, and Tr4 using the pulses. Alternatively, the relative emitted light intensity and the emitted light colors of the red R LED 71, the green G LED 72, and the blue B LED 73 may be controlled by variably changing control current values. As described above, a light reach distance and a color temperature compensation value of the red R LED 71, the green G LED 72, and the blue B LED 73 may be controlled by adjusting the relative emitted light intensity of the red R LED 71, the green G LED 72, and the blue B LED 73.

The light-emitting apparatus driver 500 also includes a transformation circuit 510 including a Direct Current (DC)/DC converter and a transformation control circuit 512. The transformation circuit 510 supplies a predetermined voltage used by the red R LED 71, the green G LED 72, and the blue B LED 73 via a diode D2. The transformation control circuit 512 forms a portion of an inverter circuit included in the transformation circuit 510 and drives the transformation circuit 510 by controlling ON/OFF of a transistor Tr5. Here, ON/OFF of the transistor Tr5 is controlled by the light-emitting controller 540.

A power battery 520 supplies power for emitting light by being connected in parallel to the auxiliary light apparatus 70. In addition, the power battery 520 is connected in parallel to the transformation circuit 510 and the transformation control circuit 512, which are connected in series to each other, via a switch 521.

A first diode D1 is a diode for preventing inverse charging, and a capacitor C1 is a large-capacity capacitor for reducing decrease of a driving voltage input to the FLCPU 533 according to an operation of the transformation circuit 510.

A radiation angle detector 531 measures a radiated angle of light emitted by the auxiliary light apparatus 70, and a switch 532 enables a user to manually change color temperature setting of the light-emitting device unit.

A circuit 534, including a transistor Tr1, an inverter INV, and a resistor R, stably controls a driving voltage of the light-emitting controller 540.

The FLCPU 533 outputs an ON/OFF driving signal to the transistor Tr1 via the inverter INV and consistently maintains the driving voltage supplied to the light-emitting controller 540.

Figure 12:
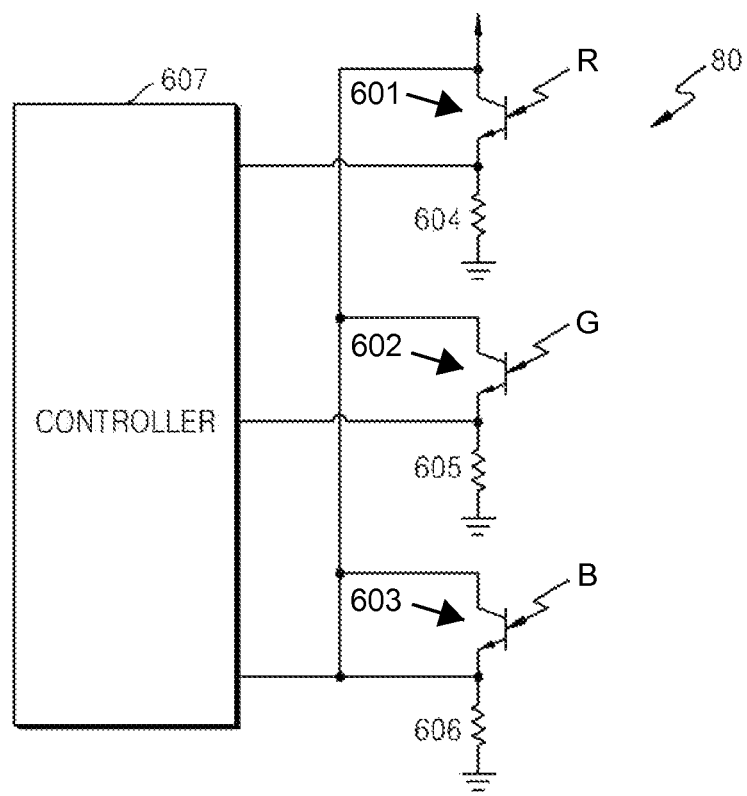
FIG. 12 is a circuit diagram of a light source color detector, according to an embodiment of the invention.

FIG. 12 is a circuit diagram of a light source color detector 80, according to an embodiment of the invention.

Referring to FIG. 12, the light source color detector 80 may be included in a light-emitting apparatus that is included in a main body or attached to the outside of the main body. In the current embodiment, background light is received by an SPD, i.e., a light source detecting sensor, with which a color filter is assembled.

A light receiver includes a red R detecting sensor 601, a green G detecting sensor 602, and a blue B detecting sensor 603. Alternately, an SPD with which a color filter using 6 or more colors including the 3 colors shown may be used. A white W detecting sensor may be further included to detect brightness.

Each of the red R detecting sensor 601, the green G detecting sensor 602, and the blue B detecting sensor 603 is connected to a power line and a ground line. Resistors 604, 605, and 606 are connected between the red R detecting sensor 601, the green G detecting sensor 602, and the blue B detecting sensor 603 and the ground line, respectively, and output signals at the nodes between each of the resistors 604, 605, and 606 and a corresponding sensor 601, 602, or 603 are input to a controller 607. The controller 607 may be, for example, a portion of the light-emitting apparatus driver 125 of FIG. 1. Alternatively, the controller 607 may be further included in the circuit of FIG. 11.

Operation of a Digital Camera

Figure 13:
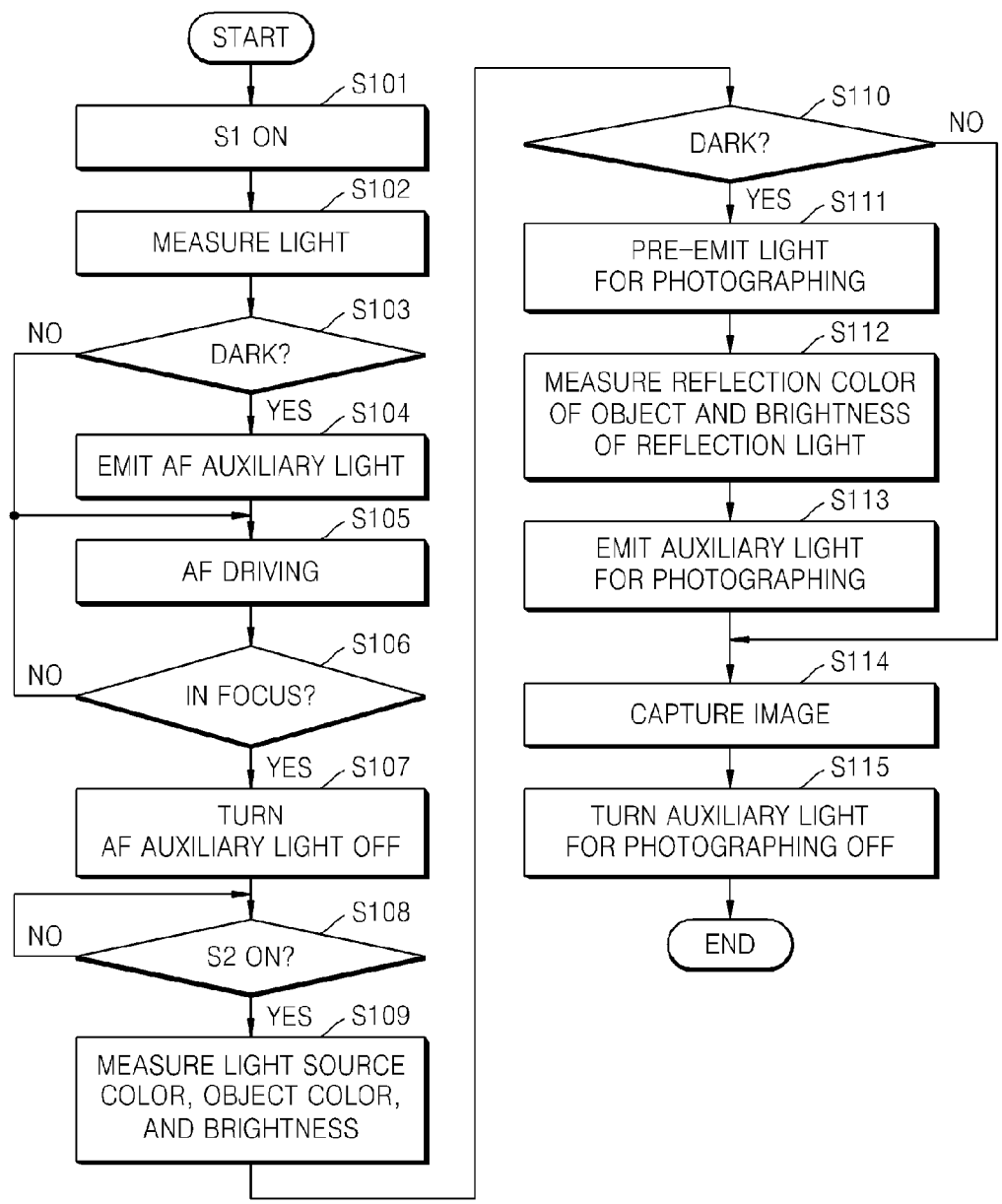
FIG. 13 is a flowchart illustrating a method of controlling a digital camera, according to an embodiment of the invention.

FIG. 13 is a flowchart illustrating a method of controlling a digital camera, according to an embodiment of the invention.

It is assumed that the digital camera 1 of FIG. 1 and the auxiliary light apparatus 10 of FIG. 2 are used in the current embodiment.

Referring to FIG. 13, when the shutter release button of the digital camera 1 is half-pressed to turn a switch S1 on in operation S101, light measuring is performed in operation S102. In operation S103, it is determined whether an object is dark (e.g., inadequately illuminated) as a result of the light measuring.

If the object is dark as a result of the light measuring, AF auxiliary light is emitted in operation S104. Otherwise, if the object is not dark AF auxiliary light is not emitted. AF driving is performed in operation S105. For example, when the auxiliary light apparatus 10 of FIG. 2 is used, white W light and green G light are simultaneously emitted as the AF auxiliary light. If background is not dark, operations S102 to S104 need not be carried out.

When the AF driving is performed in operation S105, it is determined in operation S106 whether the object is in focus. If the object is out of focus, the digital camera 1 proceeds back to operation S105 to continuously perform the AF driving. Otherwise, if the object is in focus, the AF auxiliary light is turned off in operation S107.

When the shutter release button is full-pressed to turn a switch S2 on in operation S108, a color temperature of a background around the digital camera 1 or a light source is measured in operation S109. Simultaneously, the AWB detector 116 measures a color of the object, and the AE detector 117 measures brightness.

In operation S110, it is determined again whether the object is dark. If the object is dark, the auxiliary light apparatus 126 pre-emits light for photographing in operation S111. In this case, white W light is used for the pre-emitted light. The reason why the white W light is used is to avoid dazzling the eyes by suppressing light intensity and prevent the eyes from closing when emitting light.

A color and brightness of light reflected from the object when pre-emitting the light for photographing are measured in operation S112. Light intensity and an emitted light color when emitting light for photographing may be determined using the measured values.

In operation S113, the auxiliary light apparatus 126 emits auxiliary light for photographing according to the determined light intensity and light color. Because the various methods of adjusting a color temperature have been described, a description thereof is omitted. Otherwise, if the object is not dark in operation S110, operations S111 to S113 need not be carried out.

When the main-light-emitting for photographing is performed, an image is captured in operation S114, and the auxiliary light for photographing is turned off in operation S115, if turned on.

Figure 14:
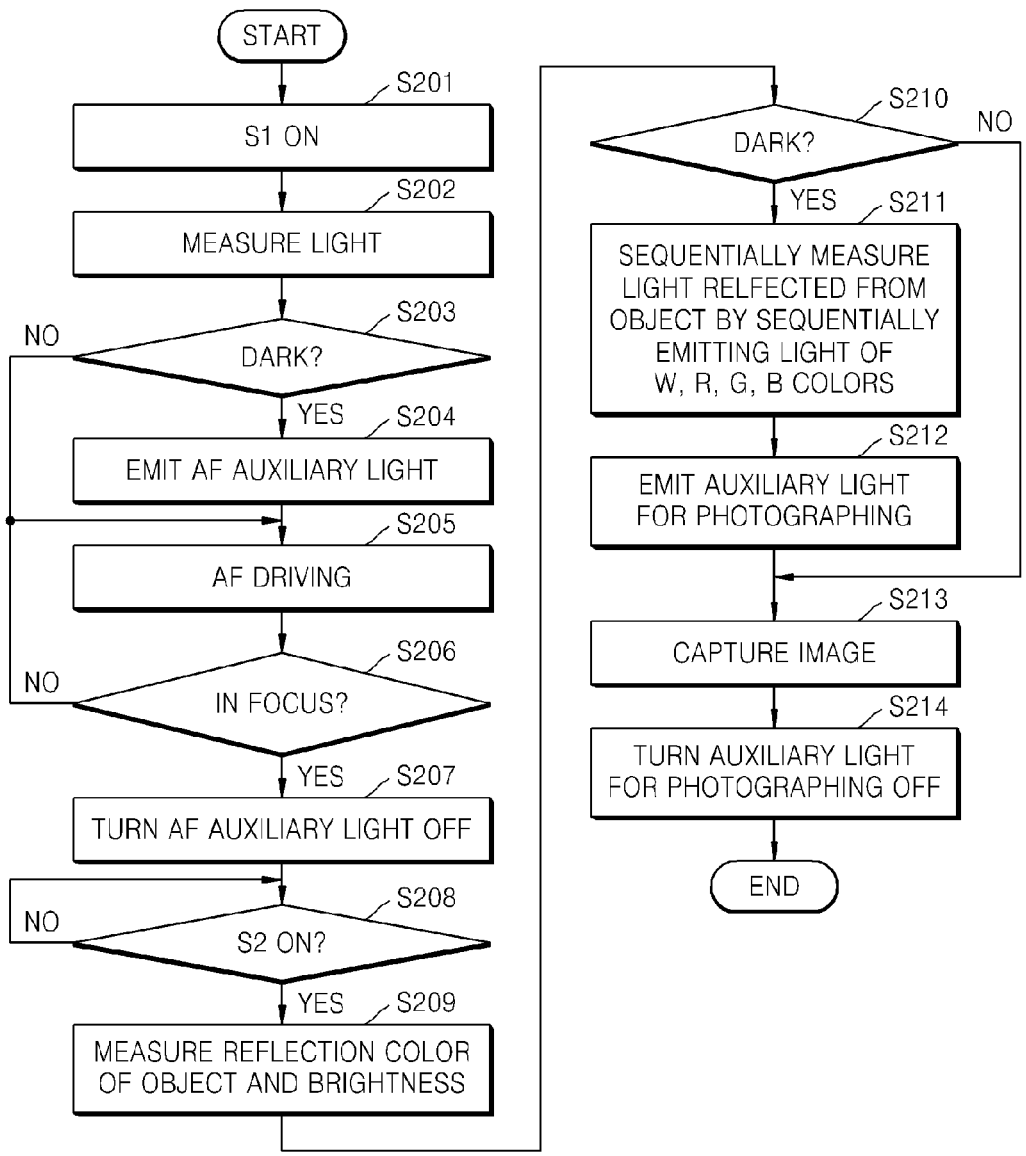
FIG. 14 is a flowchart illustrating a method of controlling a digital camera, according to another embodiment of the invention.
Figure 15:
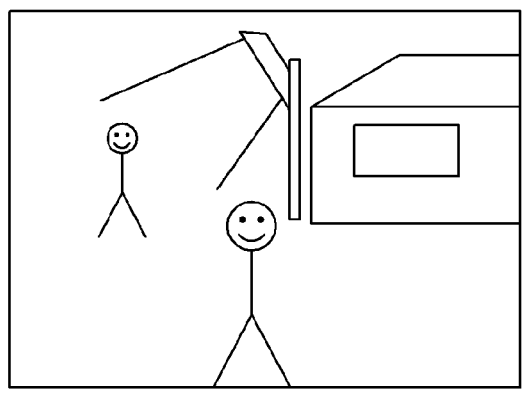
FIGS. 15 and 16 illustrate images captured by a conventional digital camera.
Figure 16:
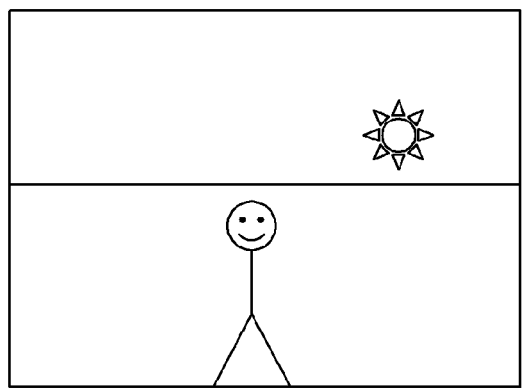

FIG. 14 is a flowchart illustrating a method of controlling a digital camera, according to another embodiment of the invention. It is assumed that the digital camera 2 of FIG. 4 and the auxiliary light apparatus 10 of FIG. 2 are used in the current embodiment. Because an operation of the digital camera 2 according to the current embodiment is almost the same as an operation of the digital camera 1 according to the embodiment of FIG. 13, only a difference therebetween is described.

Referring to FIG. 14, in operation S204, the auxiliary light apparatus 226 emits light of all colors, i.e., red R, green G, blue B, and white W colors to increase a reach distance of auxiliary light. When the shutter release button is full-pressed to turn a switch S2 on in operation S208, a color and brightness of light reflected from an object are measured in operation S209.

In operation S210, it is determined whether the object is dark. If the object is dark, the auxiliary light apparatus 226 pre-emits light for photographing in operation S211 by sequentially emitting light of red R, green G, blue B, and white W colors within a short time. When light is pre-emitted, an operation of emitting light during a single vertical synchronization interval and stopping emitting light during a single vertical synchronization interval may be repeated. For example, when the image pickup device 208 operates at a speed of 30 frames per second (fps) because the surrounding is dark, an operation of emitting light for 33 ms and stopping emitting light for 33 ms is repeated. Because light is emitted a total of 4 times with 3 idle intervals therebetween, pre-light-emitting for photographing is performed for about 230 ms.

In operation S211, information regarding Iw, Ir, Ig, and Ib and reflection ratios D(w), D(r), D(g), and D(b) of the object are acquired by measuring light reflected from the object according to the pre-light-emitting for photographing.

Information, i.e., LO, regarding background light is calculated using the acquired information and the brightness information, i.e., IO, of the light reflected from the object that is acquired in operation S209.

In operation S212, auxiliary light for photographing is radiated by determining relative light-emitting power ratios of red R, green G, blue B, and white W light colors based on the calculated background light information, i.e., LO, and the color information of the object and simultaneously emitting light of all colors of the auxiliary light apparatus 226.

According to the digital cameras and light-emitting apparatuses according to the embodiments of the invention, a photograph having a natural color sense can be reproduced by removing a sense of incongruity from a captured image.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A camera system comprising:
    a light source color detector that detects a color temperature of a light source, wherein the light source is a background that is different from an object;
    an auxiliary light apparatus that changes a color temperature of auxiliary light according to the detected color temperature of the light source, and radiates the auxiliary light onto the object, wherein the color temperature of the auxiliary light is substantially the same as the detected color temperature of the light source; and
    a white balance controller that adjusts white balance based on the light source and the auxiliary light, while the auxiliary light is being radiated;
    wherein the light source color detector detects the color temperature of the light source by sequentially pre-emitting light of color elements included in the auxiliary light apparatus, and receiving light reflected according to the pre-light-emitting.

2. The camera system of claim 1, wherein the auxiliary light apparatus is a light-emitting device capable of shifting a wavelength.

3. The camera system of claim 2, wherein the light-emitting device is an Organic Light-emitting Diode (OLED), an electroluminescent light (EL), or a light emitting diode (LED).

4. The camera system of claim 1, wherein the auxiliary light apparatus is a light-emitting device that emits colored light selected according to at least one of a first group {red R, green G, and blue B}, a second group {cyan C, magenta M, and yellow Y}, or a third group {red R, green G, blue B, and white W}.

5. The camera system of claim 1, wherein the auxiliary light apparatus controls the color temperature of the auxiliary light by adjusting a power ratio of each of a plurality of color elements.

6. The camera system of claim 5, wherein the auxiliary light apparatus adjusts the power ratio by adjusting at least one of a current value, a resistance value, or a light-emitting pulse duty ratio of a light-emitting device.

7. The camera system of claim 4, wherein each color of light emitted by the light-emitting device is the same as a color of a color filter of an image pickup device included in the camera system.

8. The camera system of claim 1, wherein the auxiliary light apparatus and the white balance controller are embedded in a digital camera for capturing an image of an object.

9. The camera system of claim 8, wherein the light source color detector is a light source color detecting sensor embedded in the digital camera.

10. The camera system of claim 8, wherein the light source color detector detects the color temperature of the light source from color information during pre-light-emitting and color information during non-light-emitting of a light-emitting apparatus.

11. The camera system of claim 8, wherein the light source color detector detects the color temperature of the light source by dividing the reflected light into a light source color component and an object color component using the color information during non-light-emitting and color information regarding the reflected light.

12. The camera system of claim 1, wherein the light source color detector and the white balance controller are embedded in a digital camera for capturing an image of an object, and the auxiliary light apparatus is detachably attached to the digital camera.

13. A light-emitting apparatus comprising:
    a light source color detector that detects a color temperature of a light source, wherein the light source is a background that is different from an object; and
    an auxiliary light apparatus that changes a color temperature of auxiliary light according to the detected color temperature of the light source, and radiates the auxiliary light onto the object, wherein the color temperature of the auxiliary light is substantially the same as the detected color temperature of the light source,
    wherein the light source and the auxiliary light are used to adjust a white balance while the auxiliary light is being radiated onto the object; and
    wherein the light source color detector detects the color temperature of the light source by sequentially pre-emitting light of color elements included in the auxiliary light apparatus, and receiving light reflected according to the pre-light-emitting.

14. The light-emitting apparatus of claim 13, wherein the light-emitting apparatus is plugged into a digital camera.

15. The light-emitting apparatus of claim 14, wherein the light-emitting apparatus transmits information regarding the detected color temperature of the light source and emitted light color information regarding the auxiliary light apparatus to the digital camera.

16. The light-emitting apparatus of claim 13, wherein the auxiliary light apparatus is a light-emitting device capable of shifting a wavelength.

17. The light-emitting apparatus of claim 13, wherein the auxiliary light apparatus is a light-emitting device for emitting colored light selected according to at least one of a first group {red R, green G, and blue B}, a second group {cyan C, magenta M, and yellow Y}, or a third group {red R, green G, blue B, and white W}.

18. The light-emitting apparatus of claim 13, wherein the auxiliary light apparatus controls the color temperature of the auxiliary color by adjusting a power ratio of each of a plurality of color elements.

19. A light-emitting method comprising:
    detecting a color temperature of a light source, wherein the light source is a background that is different from an object;
    selecting a color temperature of auxiliary light from an auxiliary light apparatus according to the detected color temperature of the light source, wherein the selected color temperature of the auxiliary light is substantially the same as the detected color temperature of the light source;
    radiating the auxiliary light onto the object; and
    adjusting a white balance based on the light source and the auxiliary light, while the auxiliary light is being radiated onto the object;
    wherein detecting the color temperature comprises:
        sequentially pre-emitting light of color elements included in the auxiliary light apparatus; and
        receiving light reflected according to the pre-light-emitting.

* * * * *